US006871121B2

(12) United States Patent
Tomson

(10) Patent No.: US 6,871,121 B2
(45) Date of Patent: Mar. 22, 2005

(54) ENTERTAINMENT SYSTEM ON-BOARD A VEHICLE FOR VISUALIZING ON A DISPLAY REAL-TIME VEHICLE DATA

(75) Inventor: James B. Tomson, Clearwater, FL (US)

(73) Assignee: Blink Engineering Corp., Tampa, FL (US)

( * ) Notice: Subject to any disclaimer, the term of this patent is extended or adjusted under 35 U.S.C. 154(b) by 0 days.

(21) Appl. No.: 10/265,848

(22) Filed: Oct. 7, 2002

(65) Prior Publication Data

US 2004/0068350 A1 Apr. 8, 2004

(51) Int. Cl.$^7$ .............................................. G06F 7/00
(52) U.S. Cl. .......................................................... 701/1
(58) Field of Search ................................ 701/1, 29, 34, 701/33

(56) References Cited

U.S. PATENT DOCUMENTS

| | | |
|---|---|---|
| 4,188,618 A | 2/1980 | Weisbart |
| 4,196,413 A | 4/1980 | Sowa |
| 4,442,424 A | 4/1984 | Shirasaki et al. |
| 4,630,043 A | 12/1986 | Haubner et al. |
| 4,787,040 A | 11/1988 | Ames et al. |
| 5,309,139 A | 5/1994 | Austin |
| 5,404,443 A | 4/1995 | Hirata |
| 5,442,553 A * | 8/1995 | Parrillo ........................ 455/420 |
| 5,578,985 A | 11/1996 | Cremers et al. |
| 5,794,164 A | 8/1998 | Beckert et al. |
| 5,884,202 A | 3/1999 | Arjomand |
| 5,949,330 A | 9/1999 | Hoffman et al. |
| 6,009,355 A | 12/1999 | Obradovich et al. |

(List continued on next page.)

FOREIGN PATENT DOCUMENTS

EP 0 841 541 A1 5/1998
WO WO97/25593 7/1997

OTHER PUBLICATIONS

SAE On–Board Diagnostics for Light and Medium Duty Vehicles Standards Manual, 1999 Edition, Jun. 1999.
Multiplex Engineering, Inc., Products Page, Printout from web site at www.multiplex–engineering.com/products.htm, Sep. 19, 2002.
Hondata Inc., Systems, Printout from web site at www.hondata.com/products.html, Oct. 1, 2002.
Multiplex Engineering, Inc., Tech Manual, Printout from web site at www.multiplex–engineering.com/tech/manual/, Oct. 1, 2002.
Flyin' Miata, Turbo Kits: Engine Computers, Printout from web site at www.flyinmiata.com/store/products.asp, Oct. 1, 2002.
Printout of Web page for "HKS Camp Info Page"at http://www.alamomotorsports.com/hks_camp_info.html, Jan. 19, 2004.

*Primary Examiner*—Yonel Beaulieu
(74) *Attorney, Agent, or Firm*—Kenneth J. Lukacher

(57) ABSTRACT

An entertainment system is provided on-board a vehicle for visualizing real-time vehicle data on a display mountable on-board the vehicle. The system has a visualization computer system for acquiring real-time data from the on-board vehicle computer representing one or more parameters of vehicle operation, and visualizing entertaining images on the display having graphics with one or more characteristics updated in real-time in accordance with such real-time data. The parameters of vehicle operation may represent those available from the vehicle computer via an On-Board Diagnostic port of the vehicle, e.g., vehicle speed, engine RPM, or air intake temperature. The graphics can represent two or three dimensional geometric object(s) or a graphical model, and the characteristics updated may represent one or more of speed of movement, shape, size, or color of such objects, or elements of the model, and as such, images of these graphics are distinctly different from typical dashboard instrumentation for operating a vehicle.

39 Claims, 6 Drawing Sheets

U.S. PATENT DOCUMENTS

| | | |
|---|---|---|
| 6,009,363 A | 12/1999 | Beckert et al. |
| 6,029,508 A | 2/2000 | Schoenbeck et al. |
| 6,175,789 B1 | 1/2001 | Beckert et al. |
| 6,202,008 B1 | 3/2001 | Beckert et al. |
| 6,225,898 B1 | 5/2001 | Kamiya et al. |
| 6,227,043 B1 | 5/2001 | Schoenbeck et al. |
| 6,253,122 B1 | 6/2001 | Razavi et al. |
| 6,275,231 B1 * | 8/2001 | Obradovich ................ 345/970 |
| 6,295,492 B1 | 9/2001 | Lang et al. |
| 6,370,449 B1 | 4/2002 | Razavi et al. |
| 6,382,127 B2 | 5/2002 | Wehner |

* cited by examiner

ENTERTAINMENT SYSTEM ON-BOARD A VEHICLE FOR VISUALIZING ON A DISPLAY REAL-TIME VEHICLE DATA

FIELD OF THE INVENTION

The present invention relates to a system for visualizing real-time vehicle data on-board a vehicle, and particularly to a system for visualizing real-time vehicle data on a display mounted in or on a vehicle for entertainment distinct from the dashboard instrumentation for operating a vehicle. The invention is useful for entertainment purposes where images on the display are of graphics, such as two or three-dimensional geometric object(s) or graphical model, which move at a speed, or change in shape, size, and/or color, in real-time in accordance with real-time changes in vehicle data, such as available via the on-board diagnostic port of the on-board vehicle computer.

BACKGROUND OF THE INVENTION

In order to facilitate maintenance, diagnosis, and repair of vehicles, such as cars and trucks, vehicles have on-board diagnostics (OBD) available from the on-board vehicle computer which controls and monitors engine operation of most vehicles available today. The OBD is available through an OBD port located in the vehicle, which is coupled by a cable to computerized diagnostic machinery when the vehicle requires maintenance by repair technicians.

The OBD port uses a communication protocol and connector standard presently referred to as On-Board Diagnostic Level 2 (OBDII) published by the Society of Automotive Engineers (SAE) as an industry standard for vehicular diagnostics in all automobiles manufactured after 1996. The OBD port and vehicular information from this port, such as vehicle speed, engine RPM, or air intake temperature, has traditionally been limited for diagnostic and repair purposes. For example, U.S. Pat. No. 5,884,202 describes a modular wireless diagnostic test and information system having a vehicular communication interface to the OBD port, and a user interface and command module for diagnostic programs upon such data received from the OBD port and other wireless meters connected to the engine. Other uses for vehicular information from this OBD port have been suggested, but these have been for a complex in-car network using a software upgradeable dashboard, as described in U.S. Pat. No. 6,253,122. This patent provides graphical images of dashboard instruments, such as may be used by a person in operating the vehicle. It would be desirable to provide a system which graphically displays information from the OBD of a vehicle for entertainment purposes, rather than for diagnostic and repair of a vehicle or for dashboard instrumentation.

Although non-dashboard displays have been provided in vehicles for entertainment purposes, they are for TV, video or DVD players, or for playing electronic games, and thus do not provide visualization of graphics related to information from the OBD of the vehicle.

SUMMARY OF THE INVENTION

It is a principal object of the present invention to provide a system on-board a vehicle for visualizing on a display real-time vehicle data using vehicle information from the on-board vehicle computer for entertainment distinct from dashboard instrumentation for operating the vehicle.

It is another object of the present invention to provide a system for visualizing graphics on a display mountable on-board a vehicle having one or more characteristics updated in real-time in accordance with real-time acquired data from the vehicle computer representing one or more parameters of vehicle operation.

Briefly described, the entertainment system embodying the present invention includes a display mountable on-board the vehicle, and a visualization computer system for acquiring real-time data from the on-board vehicle computer system representing one or more parameters of vehicle operation, and visualizing images on the display having graphics with one or more characteristics updated in real-time in accordance with the acquired data, which is updated in real-time by the visualization computer system from the vehicle computer system. The parameters of vehicle operation may represents those available from the vehicle computer via a standard on-board diagnostic port of the vehicle, e.g., vehicle speed, engine RPM, or air intake temperature. The graphics can represents two or three dimensional geometric object(s) or a graphical model, and the characteristics updated may represent one or more of speed of movement, shape, size, or color of such objects or elements of the model.

In the preferred embodiment, the visualization computer is coupled to the OBD port of a vehicle through an interface that enables the visualization computer system to request and receive data from the vehicle computer. The interface may instead be connected directly to the OBD bus of the vehicle computer, or coupled to the Electronic Control Unit (ECU) of the vehicle.

The images provide entertainment distinct from dashboard instrumentation of the vehicle, and for example, may represent, a rotating cube which changes in speed and/or color with vehicle speed and/or RPM, two or three-dimensional model of the vehicle engine in which the engine's pistons rise and fall at a rate proportional with RPMs, two or three-dimensional model of the vehicle having wheels which rotate proportional to vehicle speed, ricocheting three-dimensional spheres having ricochet rate related to vehicle speed, screen color change with air intake temperature level, or other two or three dimensional entertaining graphics, which would be impractical for a driver to use to operate a vehicle while in motion.

BRIEF DESCRIPTION OF THE DRAWINGS

The foregoing objects, features and advantages of the invention will become more apparent from a reading of the following description in connection with the accompanying drawings in which.

DETAILED DESCRIPTION OF THE INVENTION

Figure 1:
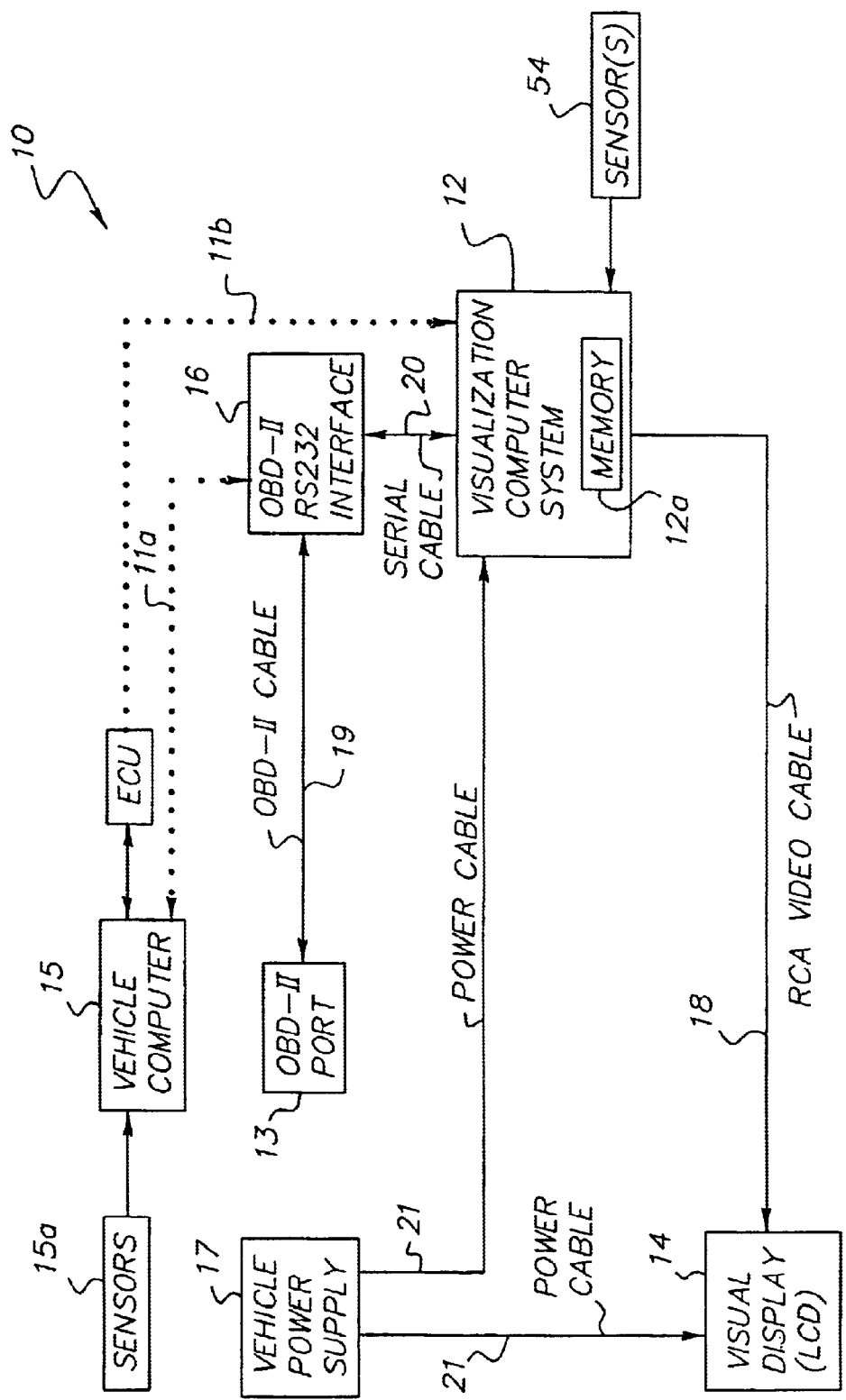
FIG. 1 is a block diagram of the present invention.
Figure 3:
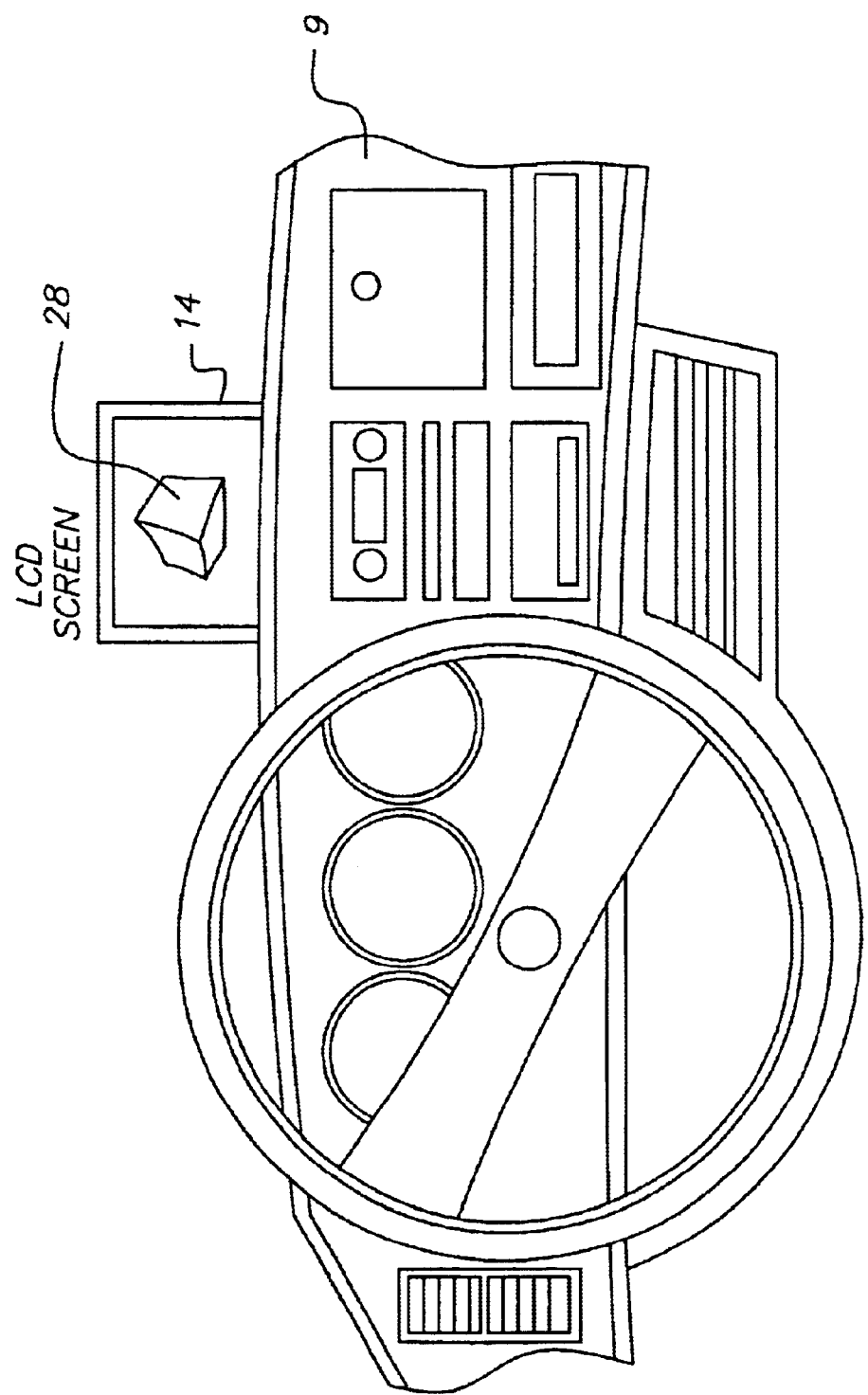
FIG. 3 is an example of a display of the system of FIG. 1 mounted on the dashboard of a vehicle.
Figure 4:
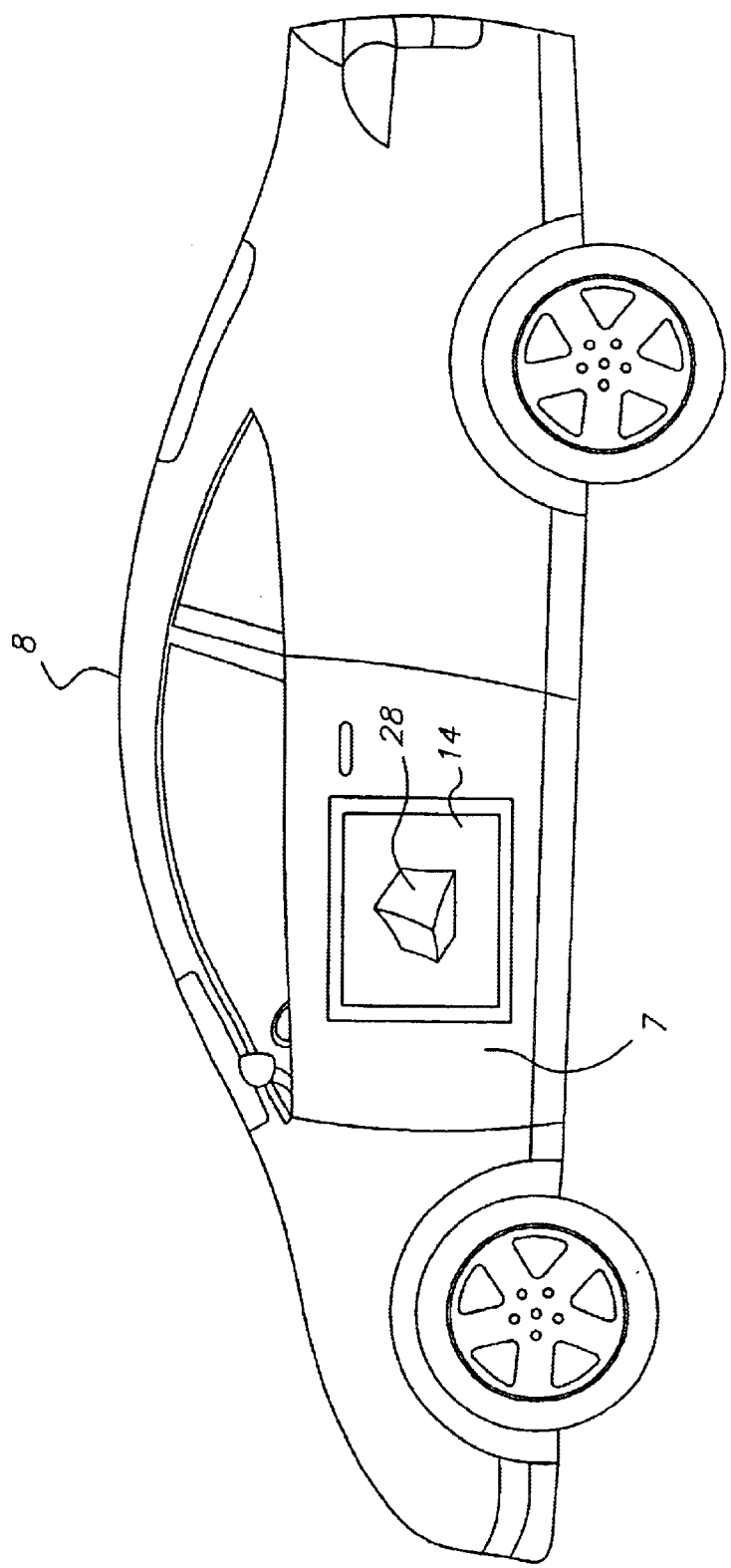
FIG. 4 is an example of a display of the system of FIG. 1 mounted on the exterior of a vehicle.

Referring to FIG. 1, a block diagram of a system 10 is shown having a visualization computer system 12 for visualizing on a display 14 real-time vehicle data obtained from a vehicle computer system 15 via an interface 16 to the OBD port 13 of a vehicle. The display 14 may be a LCD screen, preferably color, mounted on-board the vehicle, such as to the vehicle's dashboard 9 as shown in FIG. 3. Display 14 may also be mounted on-board elsewhere in the interior of the vehicle, such as on the back of a vehicle seat or visor, or may be mounted on-board along the exterior 7 of the vehicle 8, such as on a door, as shown for example in FIG. 4, or other location, such as the trunk, bumper, hood, side mirror, or roof. Mounting of the display may be, for example, by adhesive, Velcro, screws, or other attachment means suitable for mounting an LCD screen display (or monitor), and may use bracket(s) to facilitate mounting. The display 14 has a resolution suitable for viewing high resolution graphics, such as 800 by 600 pixels, and is connected by a video cable 18 to the visualization computer system, which has typical hardware/software for outputting, via cable 18, signals representing images on the display, as typical of computer systems. Preferably, the computer has a 3-D video accelerator card with TV-output to facilitate output of graphics in three-dimensions to display 14.

Although one display is illustrated, multiple displays may be used at different location mounted in the interior or along the exterior of the vehicle by splitting signals from video cable 18 to other cables coupled to other display(s). Also, the size of the display 14 may differ depending on its location on-board the vehicle, for example, door mounted display of FIG. 4 may be larger in size than an interior mounted display. Further, although an LCD screen is preferred, display 14 may be a CRT, and could represent an LCD screen or CRT mounted in the dashboard.

The visualization computer system 12 may represent a personal computer system, laptop computer, or any microprocessor based computer system programmed in accordance with the present invention. The visualization computer system 12 is located on-board the vehicle, such as in the trunk. The interface 16 is connected to the OBDII port 13 by an OBDII cable 19, which has a connector for engagement to the OBDII port. Also, the interface 16 is connected by serial cable 20, such as a DB9 serial cable, to a compatible serial port on the visualization computer system 12. The interface 16 may be located under the vehicle's dashboard, in the trunk, or elsewhere in the vehicle by proper sizing of the length of cables 19 and 20. The location of the OBD port 13 may be different in different vehicles, but often the port is located in the interior of the vehicle near the vehicle's steering column or elsewhere within three feet of the driver's seat.

The interface 16 enables data communication between the visualization computer system 12 to and from the OBD system of the vehicle computer 15, via the OBD port 13, by converting the serial communication protocol into OBD communication protocol and vice versa. For purposes of illustration, the invention is described as using On-Board Diagnostic Level 2 (OBDII) standard as set forth by the Society of Automotive Engineers (SAE), however, other OBD standards may be used. Further, serial communication is described as RS232 serial communication, but other serial communication protocols may be used, such as via a USB. Interface 16 is commercially available from Multiplex Engineering, Inc. of Santa Barbara, Calif., and for example may be their interface for SAE standard J-1850, Part No. T16-002 or T16-003. This interface defines the communication protocol between the interface 16 and visualization computer 12. For the T16-002 or T16-003 Interface, the communication protocol between the automobile data bus (via the OBD port 13) and RS-232 can be found in the tech manual for this interface from Multiplex Engineering, Inc., at web site address, www.multiplexengineering.com/tech/manual. The interface 16 preferably is a separate component, but may alternatively be on a circuit card in visualization computer 12 without serial cable 20. The features of interface 16 will be more apparent from later discussion on operation of system 10. However, other interfaces may be used so long as they enable the visualization computer system to obtain data from the OBD system of an on-board vehicle computer.

Power is supplied to the display 14 and visual computer system 12 (and to interface 16, if needed) from the vehicle power supply or battery 17. This may be by power cables 21 connected to the power distribution system of the vehicle, such as used in typical car/audio visual equipment added to the vehicle after its manufacture, or via a power adapter to the cigarette lighter/power socket of the vehicle. One or more cigarette lighter/power sockets may be located in a vehicle.

Figure 2:
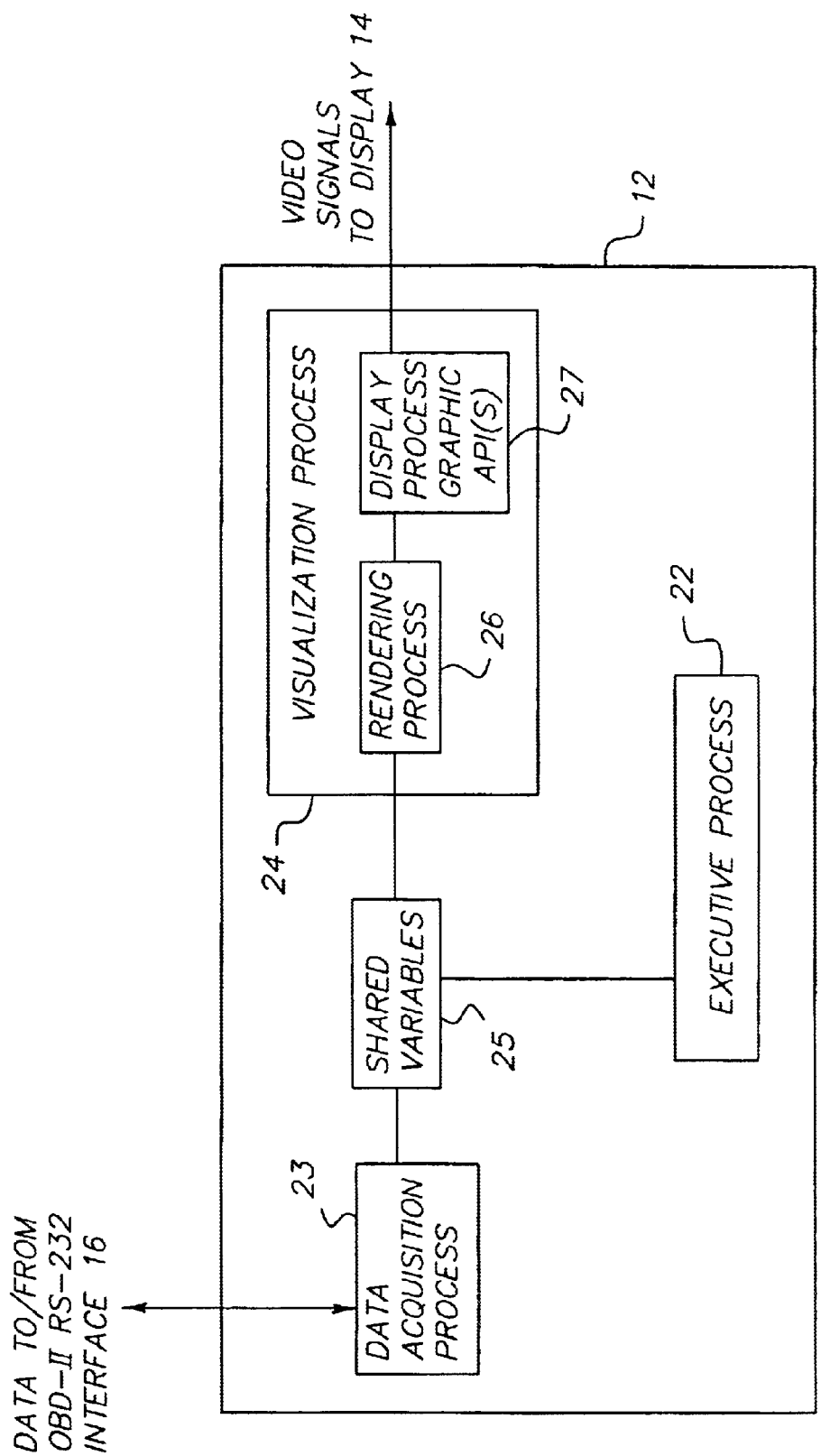
FIG. 2 is a block diagram of the processes in the visualization computer of FIG. 1.
Figure 2A:
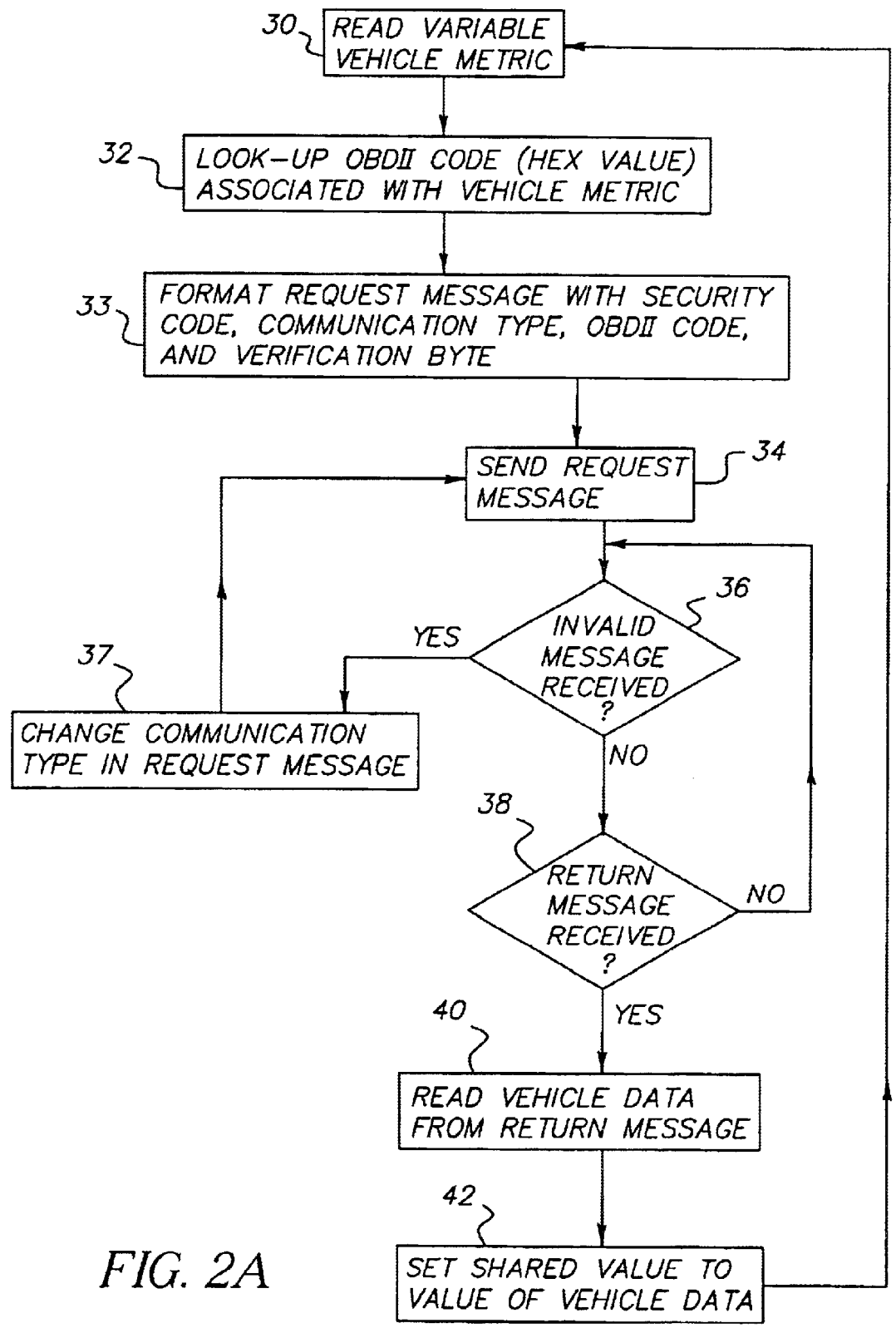
FIG. 2A is a flow chart of the data acquisition process of FIG. 2.
Figure 2B:
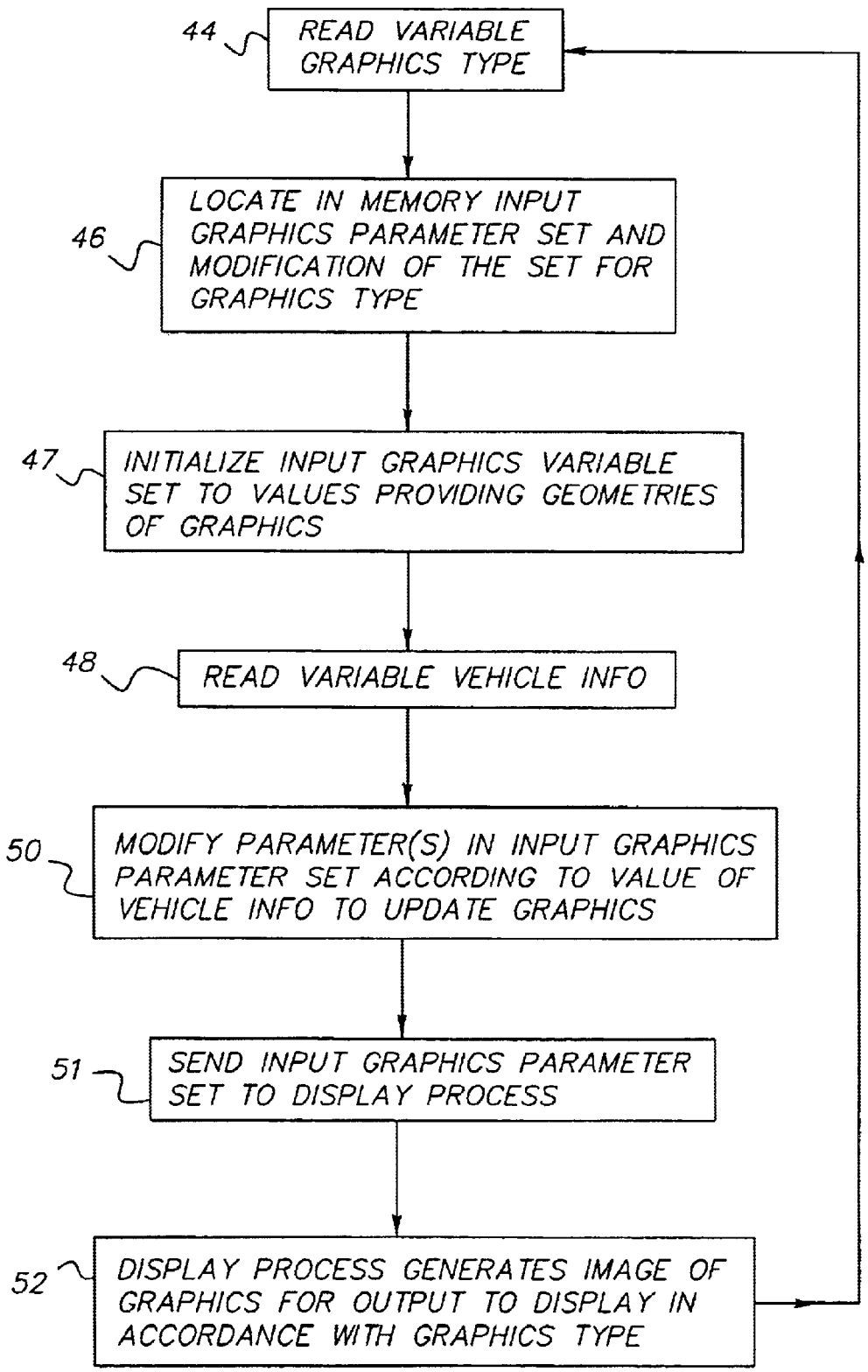
FIG. 2B is a flow chart of the visualization process of FIG. 2.

Referring to FIGS. 2, 2A and 2B, the operation of the system 10 and programming of visualization computer system 12 will now be described. Upon start-up of the visualization computer system, an executive process 22 and two independent processes, a data acquisition process 23 and a visualization process 24, which operate in parallel, are started. Although not described, the computer system 12 has an operating system, such as Windows, or Linux or other Unix systems, upon which processes 22–24 represent application programs compiled from C++ programs, but other programming languages may be used. The data acquisition process 23 and visualization process 24 may represent two POSIX threads, but other data structures may be used which allow independent processes to share common variables. See, Programming with POSIX Threads, Addison Wesley, 1997. The computer system 12 has memory 12a, such as RAM, hard drive disk, floppy disk, and/or optical disk, storing these programs, and also providing memory for shared variables 25 for use by processes 22–24.

The data acquisition process 23 enables acquiring of data in real-time from the vehicle computer 15, via the interface 16, representing one or more parameters of vehicle operation. The vehicle computer 15 may represent any typical vehicle computer system of a car, bus, truck, SUV, or other type of automobile, having typical sensors 15a for sensing operation of the vehicle, and provides an OBD system accessible via an OBD port. The parameters of vehicle operation represents those available from the vehicle computer via the OBD port of the vehicle, as described by Society of Automotive Engineers (SAE) Standard, such as, for example, J-1850, or other Standards published by the SAE for communication with OBDII compliant vehicles. Reference is made to SAE book No. HS-3000/99, entitled SAE On-Board Diagnostics for Light and Medium Duty Vehicle Standards Manual for Information on OBD Systems, OBD Communication, and the OBD Codes Available. As described below, the data acquisition process 23 using one of the OBD codes process serially requests a parameter of vehicle operation, for example, vehicle speed, engine RPM, air intake temperature, manifold pressure, coolant temperature, fuel pressure, and throttle position, but any other data typically available from a vehicle computer via the OBD port may also be requested. The executive process 22 defines a shared variable Vehicle Metric in shared memory 25, which represents a number or code representative of the parameter of the vehicle the data acquisition process 23 will obtain.

Referring to FIG. 2A, data acquisition process 23 of the visualization process 24 is shown. First, the value of variable Vehicle Metric is read (step 30), and then in a look-up-table in memory associates that value with the corresponding OBDII code (step 32). For example, Vehicle Metric may be set to a value of 1, which is associated with hexadecimal value Hex0D, e.g., an OBDII code for vehicle speed, or value of 2, which is associated with hexadecimal value Hex0F for air intake temperature. The data acquisition process 23 formats a request message in the communication protocol for serial communication to interface 16 (step 33). This request message includes multiple fields: Security field, Communication Type field, OBD field, and Verification Field. The Security field may be a one byte field containing the unique security number or code for use with the particular one of interface 16 in system 10. This security code for the interface 16 is stored in memory of the visualization computer system 12. The Communication Type field may be a one byte field containing a number representing one of the three communication types by which interface 16 may communicate with vehicles of different manufactures. At start up, arbitrary one of the communication types is located in this field, such as the value 1. The interface 16 is capable of communication in each of the three different communication protocols with OBD of the vehicle. The OBD field may be eleven bytes long, and contains the OBDII code (such as a HEX number) for the vehicle parameter being requested. The Verification field may be a one byte field used to verify the request message to the interface 16. It may represent the last byte of the addition of the first thirteen bytes (96 bits) of the message. The request message may contain other fields if required by interface 16.

At step 34, the data acquisition process 23 sends the request message as a packet serially over the serial cable 20 to the interface 16, which receives and reads the different fields of the packet. If the security code in the Security field matches that stored in memory of the interface 16, then the interface formats and sends a request for the OBDII code in the OBD field using the communication protocol in accordance to the type of the Type field of the received message. The data acquisition process 23 then waits for a return message from interface 16 before sending the next request message.

If an invalid request message is received by the data acquisition process 23 from the interface 16 (step 36), the same request message is resent with the Communication Type field set to a different communication type, such as by indexing the value of this field to reference the next communication type (steps 37 and 34). This continues until a return message is received (step 38). At step 38, if no response is received from the interface 16 within a period, for example 3 seconds, a timeout has occurred, resulting in ceasing of system 10 operation, and the visualization computer 12 will need to be restarted once the cause of the cause of the failure (e.g., communication failure, such as cable 20 disconnects from OBD port 13) has been resolved. The return message includes a Header field, Verification field, Vehicle data field; and other vehicle manufacturer specific field(s). The data acquisition process waits on the serial line from interface 16 until it reads the proper header byte in the Header field of the return message. It then retrieves the value in the Vehicle Data field of the received return message (step 40), and a shared variable Vehicle Info in shared memory 25 is set to that value (step 42). For example, the value in the Vehicle Data field may be 14 bytes (112 bits) long. The data acquisition process 23 then formats and sends the next request message to interface 16 in accordance with the variable Vehicle Metric, as described above, with the value of the Communication Type field of the last request message successfully sent and received. This process repeats in this manner continuously updating in real-time variable Vehicle Info with the desired vehicle parameter. The fields of each return message other than the Header and Vehicle Data fields need not be used, however, data in the Verification field could be used by the data acquisition process 23 to verify the return message, such as providing a Checksum value of other data in the return message. Optionally, the executive process 22 may have another shared variable to instruct the data acquisition process 23 how many times to send the same request message before checking the variable Vehicle Metric for any change.

The data acquisition process 23 updates variable Vehicle Info in real time to provide real-time vehicle information while the vehicle is in operation. The rate of receiving return messages can differ for different vehicles. However, OBD operating rate is typically 10 times per second, thus the data acquisition process 23 can obtain 10 updates of the desired vehicle information in Vehicle Info every second. The data acquisition process 23 is also capable of operating at other OBD rates.

Operating in parallel with the data acquisition process 23, the visualization process 24 enables visualizing of images on the display having graphics with one or more characteristics updated in real-time in accordance with the value of Vehicle Info acquired by the data acquisition process 23. The visualization process 24 utilizes graphic application program(s) stored in memory 12a of the visualization computer 12. These programs operate upon a set of input graphics parameters specifying points defining the lines or shapes of the graphics (screen pixel locations, and/or geometric values, e.g., diameters or sizes), color, and effects, such as lighting, shading, reflection, motion blurring, or degree of rotation for three-dimensional shaped objects, or other graphics, or patterns, for the particular graphics to be visualized.

The visualizing process 24 has a rendering process 26 for defining the input graphics parameter set, and a display process 27 for generating the graphics in accordance with this set. The system 10 may optionally allow a user to select one of different graphics for display. If so, the executive process 22 defines a shared variable Graphics Select in shared memory 25 which is set to a value in accordance with one of the selected graphics available in memory of the visualization computer. An optional user interface for enabling such selection is described later.

Referring to FIG. 2B, the rendering process 26 of the visualization process 24 reads the value of Graphics Select (step 44), and using this value locates in memory of the visualization computer 12 the input graphic parameter set for the selected graphics, and instructions on updating (modifying) such parameter(s) of this set by value of Vehicle Info (step 46). The rendering process 26 initializes the input graphic parameter set to a default set of values for the desired geometries of the graphics (step 47). Next, variable Vehicle Info is read (steps 48), and the rendering process updates (modifies) one of more of the parameters of the input graphics parameter set in accordance with read variable Vehicle Info (step 50), depending on the desired effect on the graphics being imaged. The input graphics parameter set is then sent to the display process 27 (step 51). The display process 27 receives the input graphic parameter set from the rendering process 26, and utilizing the graphic application program(s) in memory of the visualization computer 12 generates an image for output as signals to the display 14 to visualize such graphics (step 52). The display process 27 uses the particular graphical Application Programming Interface(s) stored in memory 12a for the selected graphics as set by the value of Graphics Select. The association to the value of Graphics Select at steps 46 and 51 to program code in memory 12b may be performed by look-up-table to file names, memory locations, or addresses.

In one embodiment, the display process 27 utilizes OpenGL 3D libraries available from Silicon Graphics, Inc. to provide Application Programming Interfaces (APIs) stored in memory of the visualization computer. These APIs have defined set of input parameters for their graphics as set forth by the programming protocol for using such OpenGL 3D libraries. Reference is made to the book entitled, OpenGL Programming Guide $3^{rd}$ Edition, Addison Wesley, 1999, on using this programming protocol. For example, the API's may define a rotating cube 28, such as shown in the display 14 of FIG. 3 or 4. The speed of the vehicle provided by the value of Vehicle Info is scaled to a value representing the change of each rotation (0-359 degrees) of the object. In this example, if the vehicle speed returned in Vehicle Info is 55 miles/hour and the maximum speed of the vehicle is stored in memory 12a as 150 miles per hour, then amount of change in each rotation would be about 132 degrees. Thus, the Vehicle Info value may be scaled in accordance with the percentage of change of the graphics desired.

Examples of graphics include, a rotating cube which changes in speed and/or color with vehicle speed and/or RPM, two or three-dimensional model of the vehicle engine in which the engine's pistons rise and fall at a rate proportional with RPMs, two or three-dimensional model of the vehicle having wheels at a rotation proportional to vehicle speed, ricocheting three-dimensional spheres having ricochet rate related to vehicle speed, screen color change with air intake temperature level, or other two or three dimensional entertaining graphics.

The rendering process 26 continuously checks the Vehicle Info value and updates the input graphics parameter set accordingly. This provides real-time changes in the graphics generated by the display process 27 in images on display 14. As data acquisition process 23 updates variable Vehicle Info at a rate slower (e.g., 10 times per sec.) than the rate graphics of the visualization process 24 are outputted to the display (e.g., 60 frames per sec.), the rendering process 26 uses the last value for Vehicle Info, until it detects that Vehicle Info has changed. Thus, graphics on different successive frames appear to smoothly transition on display 14.

Optionally, the system 10 may have a user interface provided by display 14 having a touch screen. The visualization computer 12 can output a graphical user interface (GUI) from its memory providing one or more screens having a list of the graphics available on system 10, and the user by touching areas of the screen associated with a particular graphics listed can selects such graphics, as typical of touch screen displays. The visualization computer 12 then sets the value of Graphics Select for the particular graphics selected. For example, various three dimensional objects may be selected such as a rotating three-dimensional cube(s), sphere(s), or other geometric shapes, two or three dimensional representations of fireworks, ricocheting spheres of or other objects, a two or three dimensional model of the vehicle's engine with moving elements such as pistons. Upon start up, a default graphics may be selected, which when visualized on the display, may be interrupted by the user touching the screen of the display, or the visualization computer can wait for input via the user interface.

Other user interfaces may also be provided, such as a wireless keypad for communication to the visualization computer, which has a wireless data communication interface to the keypad, to enable a user to select graphics shown as a list on the screen by entry of key strokes, or toggle through each of the graphics stored until a desired graphic is shown. In a further alternative, a configuration program may be provided from an optical or floppy disk in a drive of the visualization computer, specifying the desired input graphics parameter set of graphics and the graphical application program(s), which may be used by the visualization process. The configuration program setup may be defined on another computer system and stored on optical or floppy disk, which may then be loaded into the visualization computer system 12 at start up.

The above describes system 10 obtaining one vehicle parameter to effect characteristic(s) of the graphics in images outputted to the display 14. Multiple vehicle parameters may also be obtained and used to effect such graphics. This may be achieved by the executive process 22 setting each value of multiple shared variables for each of the multiple vehicle parameters, such as shared variables Vehicle Metric1, Vehicle Metric2, Vehicle MetricN, where N is the number of vehicle parameters to be obtained. The data acquisition process 23 sends successively a request message having the OBD code for each of the different shared variables Vehicle Metric1, Vehicle Metric2, . . . Vehicle MetricN. After a return message is received in response to each request message, the data acquisition process 23 updates the corresponding one of multiple shared variables Vehicle Info1, Vehicle Info2, . . . Vehicle InfoN, where N is the number of different vehicle parameters being obtained. The rendering process 26 reads shared variables Vehicle Info1, Vehicle Info2, . . . Vehicle InfoN, and uses one or more of them to effect different characteristics of the graphics in images outputted to the display. For example, in the case of two parameters being used to effect graphics, vehicle speed for Vehicle Info1 and air intake temperature for Vehicle Info2, then the results of return messages would be set as Vehicle Info1 and Vehicle Info2, respectively. In this example, changes in vehicle speed may effect speed of rotation or movement of object(s) or elements in the image, and air intake temperature may effect brightness of the color red in the image.

Optionally, when certain parameters change more frequently than others, the parameters changing more frequently can be the subject of more request messages every interval, such as a second, than those obtained which change less frequently. This may be achieved by providing shared weight variables Weight1, Weight2, . . . WeightN corresponding to each of the multiple shared variables Vehicle Info1, Vehicle Info2, . . . Vehicle InfoN, respectively, to define how many times the same request will be repeated in an interval for each vehicle parameter. In the example mentioned above, vehicle speed may change more frequently than air intake temperature, thus, Weight1 may be 9 (or 0.9) and Weight2 set to 1 (or 0.1), and in the case where ten request messages are sent every interval, in each interval the first nine would request OBD code for Vehicle Info1 and the last one request OBD code for Vehicle Info2.

The visualization computer 12 is shown in FIG. 1 coupled via the interface 16 to the OBD port 13. Alternatively, the interface 16 may instead be connected directly to the internal bus (or data bus) of the vehicle computer 15 as indicated by the dotted line 11a. In a further alternative, the visualization computer 12 may be coupled to the vehicle computer 15, via the Electronic Control Unit (ECU) of the vehicle, where interface 16 and cables 19 and 20 are not required, and the existing ECU of the vehicle is replaced with an ECU 6 capable of receiving data from the internal vehicle bus and transmitting such data over a cable (such as a serial cable), indicated by dotted line 11b, to the visualization computer 12. ECU data represents data including parameters of vehicle operation, such as vehicle speed. For example, a replacement ECU is commercially available from Hondata, Inc. of Torrance, Calif., or may represent a Link Programmable Computer from Flyin' Miata of Grand Junction, Colo.

The system 10 can easily be attached to a vehicle by coupling of the visualization computer 12 via interface 16 to OBD port 13 (or direct to the internal OBD bus, or via the ECU), and mounting display 14 to a desired location in or on the vehicle. In contrast with traditional use of OBD for vehicle diagnostic, repair, and maintenance by vehicle repair technicians, the system enables entertaining display of graphics to occupants of the vehicle (or viewers of the vehicle if exterior display(s) are used) distinct and located separate from dashboard instruments, such as the speedometer or RPM gauge used to operate the vehicle.

Optionally, additional sensor(s) 54 (FIG. 1) of vehicle operation may be provided in the vehicle separate from any sensors associated with the vehicle computer 15. Such sensor(s) 54 may be connected by cables to input ports of the visualization computer 12, and used by system 10 similar to data obtained from the vehicle computer 15. For example, such sensor(s) 54 may represent a sensor for braking energy, such as used in auto racing, or a sensor for measuring lateral G-force. Data from sensor(s) 54 represents parameter(s) of vehicle operation which may be used by the visualization computer 12 in combination with data acquired from the vehicle computer 15, or data from sensor(s) 54 may be used by the visualization computer 12 exclusive of data from the vehicle computer 15, and thus with or without inclusion of interface 16, and cables 19 and 20 in system 10.

From the foregoing description, it will be apparent that an entertainment system for visualizing on a display real-time vehicle data on-board a vehicle has been provided. Variations and modifications of the herein described system will undoubtedly suggest themselves to those skilled in the art. Accordingly, the foregoing description should be taken as illustrative and not in a limiting sense.

What is claimed is:

1. A system on-board a vehicle for visualizing real-time vehicle data provided by an on-board vehicle computer comprising:
    means for acquiring data from the vehicle computer representing at least one parameter of vehicle operation;
    a display mountable on-board said vehicle; and
    means for visualizing images on said display having one or more three-dimensional graphical elements which change in one or more characteristics responsive to changes in said acquired data in which said acquiring means provides real-time updates in said data to said visualizing means.

2. The system according to claim 1 wherein said characteristics represent one or more selected from the group of speed of movement, shape, size, or color.

3. The system according to claim 1 wherein at least one of said three-dimensional graphical elements represents a three-dimensional object.

4. The system according to claim 1 wherein said visualizing means further images on said display one or more two-dimensional graphical elements.

5. The system according to claim 1 wherein at least one of said images represents a model of the vehicle or a component of the vehicle, and said characteristics represent one or more elements of said model which change responsive to changes in said acquired data.

6. The system according to claim 1 wherein said parameter of vehicle operation represents one of vehicle speed, engine RPM, air intake temperature, or throttle position.

7. The system according to claim 1 wherein said parameter of vehicle operation represents one of said parameters available from the vehicle computer via an on-board diagnostic port of said vehicle.

8. The system according to claim 1 wherein said acquiring means comprises:
    a visualization computer system for requesting said data representing said parameter of vehicle operation; and
    an interface coupled to said visualization computer system and said vehicle computer for enabling said visualization computer system to request and receive said data.

9. The system according to claim 8 wherein the vehicle has an on-board diagnostic port, and said system further comprises a cable connecting said interface to said diagnostic port.

10. The system according to claim 8 wherein the vehicle computer has a data bus and said interface in coupled to said data bus of said vehicle computer.

11. The system according to claim 8 further comprising an Electronic Control Unit coupled to said vehicle computer, and said interface is coupled to said Electronic Control Unit to request and receive said data representing said parameter of vehicle operation.

12. The system according to claim 8 wherein said visualization computer system provides said visualizing means.

13. The system according to claim 1 wherein said visualizing means further comprises:
    means for defining one or more graphics representing at least said one or more three-dimensional graphical elements which change in real-time responsive to changes in said acquired data; and
    means for generating images in accordance with said graphics and outputting said images to said display.

14. The system according to claim 8 wherein said visualization computer system has memory and provides said visualizing means by generating images using one or more graphical application programs stored in said memory in accordance with at least said one or more three-dimensional graphical elements, and outputting said images to said display.

15. The system according to claim 12 wherein said visualization computer system is located on-board said vehicle separate from said vehicle computer.

16. The system according to claim 1 wherein said display represents one of a color LCD screen or CRT.

17. The system according to claim 13 further comprising a user interface for enabling a user to select the graphics of said images on said display.

18. The system according to claim 1 wherein said display is mounted to the dashboard of the vehicle.

19. The system according to claim 1 wherein said display is mounted in the interior of said vehicle.

20. The system according to claim 1 wherein said display is mounted to the exterior of said vehicle.

21. The system according to claim 1 wherein said display represents a plurality of displays mounted on-board the interior or exterior of said vehicle.

22. The system according to claim 1 wherein said acquiring means acquires data from the vehicle computer representing multiple different parameters of vehicle operation, and said visualizing means visualizes images on said display having said one or more three-dimensional graphical elements which change in one or more characteristics response to changes in one or more of said multiple different parameters of said acquired data.

23. The system according to claim 1 wherein said data represents one or more parameters of vehicle operation and is provided by one or more sensors of vehicle operation located in said vehicle.

24. A method on-board a vehicle for visualizing real-time vehicle data provided by an on-board vehicle computer comprising the steps of:
acquiring data from the vehicle computer representing at least one parameter of vehicle operation;
mounting a display on-board said vehicle; and
visualizing images on said display having graphics with one or more changing three-dimensional characteristics updated in real-time in accordance with changes in said acquired data in which said acquiring step is carried out in real-time to update in said data.

25. The method according to claim 24 wherein said visualizing step further comprises the steps of:
defining one or more graphics which change in accordance with said acquired data;
generating images in accordance with said graphics; and
outputting said images to said display.

26. A system on-board a vehicle for visualizing real-time vehicle data comprising:
means for acquiring data from one of more sensors in said vehicle representing at least one parameter of vehicle operation;
a display mountable on-board said vehicle; and
means for visualizing images on said display having one or more three-dimensional graphical elements which change in one or more characteristics responsive to changes in said acquired data in which said acquiring means provides real-time updates in said data to said visualizing means.

27. The system according to claim 26 wherein said vehicle has a vehicle computer system and said sensors are coupled to said vehicle computer system, and said acquiring means and visualizing means is provided by a computer system, separate from said vehicle computer system, and coupled to said vehicle computer system for acquiring data from said sensors.

28. The system according to claim 26 wherein said vehicle has a vehicle computer system separate from said sensors, and said acquiring means and visualizing means is provided by a computer system coupled to said sensors and separate from said vehicle computer system.

29. An apparatus for on-board attachment to a vehicle computer, said apparatus comprising a computer system, separate from said vehicle computer, coupled to said vehicle computer for acquiring data from the vehicle computer representing at least one parameter of vehicle operation, and producing images having graphics with at least one or more three-dimensional characteristics updated in real-time in accordance with said acquired data.

30. The apparatus according to claim 29 further comprising a display in said interior or exterior of said vehicle and coupled to said computer system for displaying said images.

31. A system on-board a vehicle for visualizing real-time vehicle data, wherein said vehicle has an on-board vehicle computer, said system comprising:
at least one display mountable on-board said vehicle; and
a computer system separate from the on-board vehicle computer having means for acquiring data representing at least one parameter of vehicle operation and means for visualizing images on said display having graphics with at least one changing three-dimensional characteristic updated in real-time in accordance with changes in said acquired data.

32. The system according to claim 31 wherein said acquiring means acquires said data from the on-board vehicle computer via a diagnostic port of the vehicle.

33. The system according to claim 31 wherein said acquiring means acquires said data from the on-board vehicle computer without utilizing a diagnostic port of the vehicle.

34. The system according to claim 31 wherein said acquiring means acquires said data from one or more sensors in the vehicle.

35. The system according to claim 1 wherein said images on said display provide entertainment and are distinct from dashboard instrumentation for operating said vehicle.

36. The system according to claim 9 wherein said diagnostic port is an OBD port of the vehicle which communicates by OBDII communication protocol with said interface.

37. The system according to claim 1 wherein said parameter is speed of the vehicle, said one or more three-dimensional graphical elements is at least one three-dimensional geometric object, said one or more characteristics is at least speed of rotation or motion of said three-dimensional geometric object on said display, and said three-dimensional geometric object changes in said speed of rotation or motion responsive to changes in said speed of said vehicle.

38. The method according to claim 24 wherein said vehicle has a OBD port and said acquiring step acquires said data via said OBD port utilizing OBDII communication protocol.

39. The method according to claim 24 wherein said characteristics represent one or more selected from the group of speed of movement, shape, size, or color.

* * * * *